US008652611B2

United States Patent
Gaudig et al.

(10) Patent No.: US 8,652,611 B2
(45) Date of Patent: Feb. 18, 2014

(54) PLASTIC MOULDED PART FOR A MOTOR VEHICLE

(75) Inventors: Ralf Gaudig, Rüsselsheim (DE); Klaus Kuhlmann, Nauheim (DE); Werner Berhard, Nauheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 339 days.

(21) Appl. No.: 12/879,339

(22) Filed: Sep. 10, 2010

(65) Prior Publication Data

US 2011/0086203 A1    Apr. 14, 2011

(30) Foreign Application Priority Data

Sep. 11, 2009  (DE) .......................... 10 2009 040 934

(51) Int. Cl.
- *B60R 13/00* (2006.01)
- *B32B 3/00* (2006.01)
- *B32B 3/12* (2006.01)
- *B32B 3/26* (2006.01)

(52) U.S. Cl.
USPC ................. 428/156; 428/31; 428/158; 428/71

(58) Field of Classification Search
USPC .................. 428/71, 156, 158, 159, 304.4, 31, 428/318.8, 317.9, 318.4; 296/146.7, 296/187.02, 1.08
See application file for complete search history.

(56) References Cited

U.S. PATENT DOCUMENTS

| 5,700,050 A | 12/1997 | Gonas |
| 6,099,948 A * | 8/2000 | Paver, Jr. .................... 428/304.4 |
| 6,334,504 B1 | 1/2002 | Sato et al. |

FOREIGN PATENT DOCUMENTS

| DE | 3634559 C1 | 6/1987 |
| DE | 29623807 U1 | 3/2000 |
| DE | 19937000 A1 | 2/2001 |
| DE | 10032556 A1 | 1/2002 |
| DE | 10251762 A1 | 5/2004 |
| DE | 10357907 A1 | 7/2005 |
| EP | 0670257 A1 | 9/1995 |
| EP | 1174200 A2 | 1/2002 |
| EP | 1280378 A2 | 1/2003 |
| EP | 1762469 A2 | 3/2007 |
| JP | H080183101 A | 7/1996 |
| WO | 9817456 | 4/1998 |
| WO | 03031252 A1 | 4/2003 |

OTHER PUBLICATIONS

German Patent Office, German Search Report for Application No. 102009040934.3, dated Sep. 9, 2009.
UK IPO, British Search Report for Application No. 1015056.3, dated Dec. 17, 2010.

* cited by examiner

*Primary Examiner* — Catherine A Simone
(74) *Attorney, Agent, or Firm* — Ingrassia Fisher & Lorenz, P.C.

(57) ABSTRACT

A bionically designed plastic molded part is provided, in particular a carrier, for a motor vehicle, with at least one low-load region for accommodating relatively low loads, which is formed using thin-wall technology, and at least one high-load region for accommodating relatively high loads, which is formed using plastic foam technology and connected to at least one low-load region.

11 Claims, 1 Drawing Sheet

PLASTIC MOULDED PART FOR A MOTOR VEHICLE

CROSS-REFERENCE TO RELATED APPLICATION

This application claims priority to German Patent Application No. 102009040934.3, filed Sep. 11, 2009, which is incorporated herein by reference in its entirety.

TECHNICAL FIELD

The present invention relates to a plastic molded part for a motor vehicle and also to a method for the manufacture thereof.

BACKGROUND

Plastic molded parts, i.e., components that are originally shaped or reshaped from plastic and if appropriate subsequently machined, for example by removal of material, are used in a broad range of ways in motor vehicles, for example as a carrier or lining, for instance in the form of instrument carriers, interior linings or the like.

It is known from DE 36 34 559 C1 to design a part of a multiple-part instrument carrier as a plastic injection-molded part entirely using thin-wall technology. This technology advantageously allows components which do not have to accommodate any relatively high loads to be produced with wall thicknesses in the region of one millimeter in order to save weight and material.

On the other hand, DE 199 37 000 A1 discloses a motor vehicle door inner lining which is manufactured entirely using plastic foam technology with a low-density foam core and a compact outer skin in the thermoplastic foam injection molding ("TFIM") method. DE 296 23 807 U1 proposes a sun protection screen which is designed by foaming with steam, again entirely using plastic foam technology.

It is known from DE 103 57 907 B4, which is to this extent non-generic, to bionically optimize the framework structure of a hybrid door pillar made of an iron and a light metal alloy.

At least one object of the present invention is to provide an improved plastic molded part for a motor vehicle. In addition, other objects, desirable features, and characteristics will become apparent from the subsequent summary and detailed description, and the appended claims, taken in conjunction with the accompanying drawings and this background.

SUMMARY

According to an embodiment of the invention, thin-wall technology and plastic foam technology, which are already known per se, are combined with each other in a plastic molded part in that one or more low-load regions, which have to accommodate at most low loads during operation, are formed using thin-wall technology and connected to one or more high-load regions which are formed using plastic foam technology and into which relatively high loads are introduced during operation.

High-load regions of this type, which are formed using plastic foam technology and have a single or multiple-part foam core which, in a preferred design, is wholly or partly encased with a plastic shell, wherein an interior, which is defined by the plastic shell, can be filled out wholly or partly by the foam core, have a reduced weight in relation to their volume owing to the relatively low density of the core, which is foamed by blowing agents and/or fluids, in particular air or steam, while on the other hand they provide relatively high rigidity owing to their large external dimensions which are large in relation to their weight. In addition, the foam core can advantageously have an oscillation-damping and in particular sound-absorbing effect.

According to an embodiment of the invention, the combination of both technologies thus makes it possible to strengthen high-load regions in a targeted manner or to reduce the weight of low-load regions in a targeted manner, the term "a relatively low load" including in the sense of the present invention also complete freedom from loads.

Both technologies are particularly advantageously combined in bionically designed plastic molded parts which are structure-optimized, for example, using the CAO (computer aided optimization) method for shape optimization or the SKO method for topology optimization. In this case, the growth behavior of biological force carriers, such as for example trees or bones, is imitated in that the component to be optimized virtually approximately grows, in accordance with the "accumulating of material at points subjected to relatively high loads and/or removal of material at points subjected to relatively low loads" rule of biological growth, in such a way as, for example, a bone would do if it had to take over the function of the component. This can be used to reduce tension peaks and thus to increase strength.

The optimization can be carried out for the component as a whole or only for critical regions. Preferably, the tensions in the component or region to be optimized are determined with the aid of a finite element model (FEM) in that an FEM analysis calculates the tensions on the basis of which the biological growth rule is then, for example, simulated and a growth shift resulting there from is determined. In the next step, a network correction can be carried out in order to adapt the FEM network to the new contour. This growth cycle is preferably carried out in a plurality of iterations for the respectively modified structure.

In a plastic molded part which is bionically designed, in particular structure-optimized in accordance with the invention, the high-load regions formed using plastic foam technology can thus extend, in particular in a rib-like manner, substantially along the load paths and accommodate and forward the basic loads there, whereas low-load regions formed using thin-wall technology can connect these load paths to one another in order to form a component which is closed at least in certain regions. In addition, one or more medium-load regions for accommodating moderate loads can also be formed using conventional technology, in particular by injection molding, with relatively high wall thicknesses, for example of 3 millimeter or more, and connected to low and/or high-load regions. This allows the structure to be adapted even more effectively to the loading and the weight thus to be reduced or the strength and/or rigidity increased.

In a preferred embodiment, two or more low, medium and/or high-load regions are manufactured integrally with one another, preferably using the same tool, in particular using the same mould. This can take place, in particular, in a multiple-stage method in which firstly regions are manufactured using one technology and subsequently regions are manufactured using another technology.

Thus, for example, one or more low-load regions can be manufactured by means of extrusion, deep-drawing and/or compacting. Preferably, low-load regions are manufactured by means of injection molding, wherein preferred wall thicknesses of at most 1.2 mm, preferably at most 1 mm and particularly preferably of at most 0.9 mm can be achieved, for example, via intermediate cooling, elevated injection pressure, balanced sprue and/or the use of plastic having a relatively high flowability. Relatively high injection pressures allow shortened injection times of preferably less than 1 second, while increasing on the other hand the rigidity of moulds, compared in each case to conventional injection molding at relatively high wall thicknesses of at least 3 mm.

In high-load regions, foam cores can be manufactured subsequently or at the same time, for example by injecting fluid, in particular air and/or steam, and/or by injecting plastic foam. Additionally or alternatively, plastic can also be expanded for this purpose, for example by exothermic and/or endothermic blowing agents. It is also possible to subsequently sheathe the initially manufactured foam core with the plastic shell which can then be continued, for example, using thin-wall technology in low-load regions.

In addition or as an alternative to regions which are formed integrally with one another using different technology, two or more regions can also be connected to one another with a material-to-material fit, for example welded and/or adhesively bonded.

In particular low-load regions, which are formed using thin-wall technology and have low strength owing to the wall thickness, and high-load regions, which accommodate relatively high loads, are made in a preferred embodiment of fiber-reinforced plastic, for example glass fiber-reinforced or carbon fiber-reinforced plastic (GFRP, CFRP).

In addition to injection molding, plastic molded parts according to the invention can preferably also be manufactured by extrusion, blow molding, film blowing and/or calendaring. The plastic foam technology used may, in particular, be thermoplastic foam molding (TFM), MuCell or the like.

Thin-wall technology and foam plastic technology combined therewith advantageously allow sink marks, caused for example by shrinkage during cooling, weld lines caused by the converging of melt flows and the like, to be reduced or avoided, in particular by way of bionic design. Therefore, a plastic molded part according to an embodiment of the invention can advantageously have an integrally formed visible surface as a lining or screening. Additionally or alternatively, it is also possible to provide a separate cover layer which can be made, for example, of a relatively soft material and be adhesively bonded to the plastic molded part.

A preferred material for a plastic molded part according to an embodiment of the invention is an, optionally fiber-reinforced, thermoplastic such as acrylonitrile butadiene styrene (ABS), polyamide (PA), polylactate (PLA), polymethyl methacrylate (PMMA), polycarbonate (PC), polyethylene terephthalate (PET), polyethylene (PE), polypropylene (PP), polystyrene (PS), polyether ketone (PEEK) and polyvinyl chloride (PVC) or a polyblend.

A plastic molded part according to an embodiment of the invention can serve in particular as a carrier, for example as an instrument carrier, and/or as a lining, such as for example as an inner door lining. Preferably, it is used as an interior lining part.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
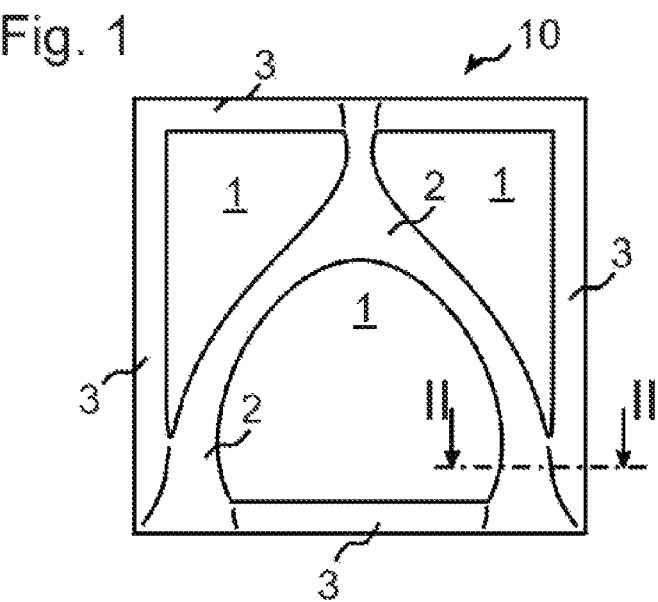
FIG. 1 is a partly schematic plan view of a plastic molded part according to an embodiment of the present invention.

FIG. 1 is a plan view of a plastic carrier 10 with a rectangular outer frame 3 which is manufactured, using normal injection molding technology, at a wall thickness of 3 mm and has to accommodate only moderate loads resulting from the linking of the carrier 10 to its edge.

Three low-load regions 1 having a minimal wall thickness of approximately 1 mm are manufactured integrally with this frame-like medium-load region 3 using thin-wall technology in that, during injection-molding, the process is managed accordingly and an appropriate tool is used.

Figure 2:
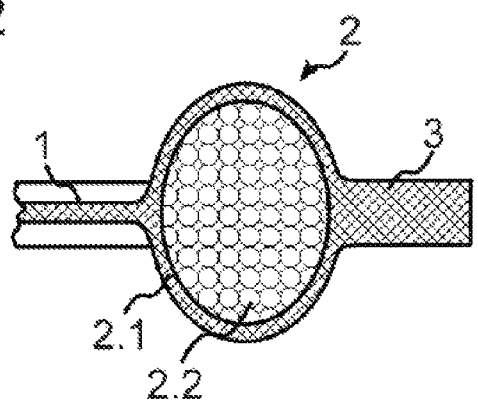
FIG. 2 is a partly schematic view of the plastic molded part according to FIG. 1 along the sectional line II-II indicated therein.

The carrier 10 is intended to accommodate a relatively high load at the centre of its upper edge and to support the relatively high load at its two outer lower corners. A bionic structure optimization produces a material thickening 2 along the T-shaped load path of this main operational load. This material thickening 2 is, as may be seen in the detailed cross section of FIG. 2, manufactured using plastic foam technology in that there is generated, during or after the manufacture of the frame region 3 and the low-load region 1, by injecting a blowing agent a porous plastic foam core 2.2 which is encased at its external circumference by a plastic shell 2.1. The size and porosity of the foam core 2.2 can be predefined, like the wall thickness of the plastic shell 2.1 which is urged by the foam core to the injection mould and compacted there, via the process parameters such as mould filling times, temperature control, subsequent pressing and the like, the shape of the foam core 2.2 and thus the high-load region 2, which is rib-like, along the T-shaped load path through the injection mould.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A plastic molded part for a motor vehicle, comprising:
a low-load region adapted to accommodate a low load, the low-load region comprising thin-wall technology; and
a high-load region adapted to accommodate a high load that is greater than the low load, the high-load region comprising plastic foam technology, wherein the high-load region is configured to extend in a rib-like manner along a plurality of load paths to accommodate and forward a load, and wherein the high-load region is connected to the low-load region.

2. The plastic molded part according to claim 1, further comprising a medium-load region adapted to accommodate a moderate load that is greater than the low load and less than the high load, the medium-load region comprising technology other than the thin-wall technology and the plastic foam technology and connected to at least one of the low-load region or the high-load region.

3. The plastic molded part according to claim 2, wherein at least two of the low-load region, the high-load region, or the medium-load region are manufactured integrally with one another.

4. The plastic molded part according to claim 2, wherein at least two of the low-load region, the high-load region, or the medium-load region are connected with a material-to-material fit.

5. The plastic molded part according to claim 2, wherein at least one of the low-load region, the high-load region, or the medium-load region is made of a fiber-reinforced plastic.

6. The plastic molded part according to claim 1, wherein the low-load region comprises a wall thickness of at most approximately 1.2 mm.

7. The plastic molded part according to claim 1, wherein the low-load region comprises a wall thickness of at most approximately 1 mm.

8. The plastic molded part according to claim 1, wherein the low-load region comprises a wall thickness of at most approximately 0.9 mm.

9. The plastic molded part according to claim 1, wherein the high-load region comprises a foam core and a plastic shell that at least partly encases the foam core.

10. A plastic molded part for a motor vehicle, comprising:
a low-load region adapted to accommodate a low load, the low-load region comprising thin-wall technology;
a high-load region adapted to accommodate a high load that is greater than the low load, the high-load region comprising plastic foam technology, wherein the high-load region is configured to extend in a rib-like manner along a plurality of load paths to accommodate and forward a load, and wherein the high-load region is connected to the low-load region; and
a medium-load region adapted to accommodate a moderate load that is greater than the low load and less than the high load, the medium-load region comprising technology other than the thin-wall technology and the plastic foam technology and connected to at least one of the low-load region or the high-load region.

11. A plastic molded part for a motor vehicle, comprising:
a low-load region adapted to accommodate a low load, the low-load region comprising thin-wall technology, wherein the thin-wall technology comprises a wall thickness of at most approximately 1.2 mm;
a high-load region adapted to accommodate a high load that is greater than the low load, the high-load region comprising plastic foam technology, wherein the high-load region is configured to extend in a rib-like manner along a plurality of load paths to accommodate and forward a load, and wherein the high-load region is connected to the low-load region; and
a medium-load region adapted to accommodate a moderate load that is greater than the low load and less than the high load, the medium-load region comprising technology other than the thin-wall technology and the plastic foam technology and connected to at least one of the low-load region or the high-load region.

* * * * *